(12) United States Patent
Shi et al.

(10) Patent No.: US 8,254,643 B2
(45) Date of Patent: Aug. 28, 2012

(54) IMAGE PROCESSING METHOD AND DEVICE FOR OBJECT RECOGNITION

(75) Inventors: Zhongchao Shi, Beijing (CN); Haike Guan, Kanagawa (JP); Gang Wang, Beijing (CN); Tao Li, Beijing (CN); Cheng Du, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 1195 days.

(21) Appl. No.: 12/076,676

(22) Filed: Mar. 21, 2008

(65) Prior Publication Data

US 2008/0232698 A1    Sep. 25, 2008

(30) Foreign Application Priority Data

Mar. 21, 2007    (CN) .......................... 2007 1 0087879

(51) Int. Cl.
*G06K 9/00*    (2006.01)
(52) U.S. Cl. .................... 382/118; 382/181; 382/227
(58) Field of Classification Search .................. 382/118, 382/181
See application file for complete search history.

(56) References Cited

U.S. PATENT DOCUMENTS

| | | | |
|---|---|---|---|
| 6,671,391 B1 * | 12/2003 | Zhang et al. ................... | 382/118 |
| 7,016,881 B2 | 3/2006 | Li et al. | |
| 7,020,337 B2 | 3/2006 | Jones et al. | |
| 7,024,033 B2 | 4/2006 | Li et al. | |
| 7,050,607 B2 | 5/2006 | Li et al. | |
| 7,099,505 B2 | 8/2006 | Li et al. | |
| 7,099,510 B2 | 8/2006 | Viola et al. | |
| 2003/0108244 A1 * | 6/2003 | Li et al. ......................... | 382/227 |
| 2004/0013304 A1 * | 1/2004 | Viola et al. .................... | 382/224 |
| 2005/0013479 A1 | 1/2005 | Xiao et al. | |
| 2005/0063582 A1 * | 3/2005 | Park et al. ..................... | 382/154 |
| 2006/0120572 A1 * | 6/2006 | Li et al. ......................... | 382/118 |
| 2006/0120604 A1 | 6/2006 | Kim et al. | |
| 2007/0053614 A1 | 3/2007 | Mori et al. | |

FOREIGN PATENT DOCUMENTS

| | | |
|---|---|---|
| EP | 1 615 160 | 1/2006 |
| JP | 2003-036439 | 2/2003 |
| JP | 2006-331266 | 12/2006 |

OTHER PUBLICATIONS

European Search Report dated Dec. 17, 2010 issued in corresponding European Application No. 08250989.4.

(Continued)

*Primary Examiner* — Hadi Akhavannik

(74) *Attorney, Agent, or Firm* — Harness, Dickey & Pierce, P.L.C.

(57) ABSTRACT

An object image detection device is disclosed that is able to rapidly detect an object image from an input image. The object image detection device includes an image block generation unit to generate plural image blocks from the input image for detecting the object images, an image classification unit to determine whether each of the image blocks includes one or more of the object images by using one or more features of the object images, and acquire the image blocks including the object images to be object image candidates; and a detection unit to sequentially detect the object images from the object image candidates. The image classification unit acquires the object image candidates based on a relative positional relationship between the image blocks and already-acquired object image candidates.

12 Claims, 9 Drawing Sheets

OTHER PUBLICATIONS

Yong Ma et al. "Real-Time Rotation Invariant Face Detection Based on Cost-Sensitive Adaboost", *Proc. Int'l Conf. on Image Proc.*, Barcelona Spain, pp. 921-924 (Sep. 14, 2003).

Stan Z. Li et al., "Statistical Learning of Multi-View Face Detection", *Second Int'l Symp, ISPA 2004 Proc.*, Hong Kong, China pp. 67-81 (May 27, 2002).

Satyanadh Gundimada et al., "A Novel Neighborhood Defined Feature Selection on Phase Congruency Images for Recognition of Faces with Extreme Variations", *Int'l J. IT*, Singapore, pp. 25-31 (Jan. 1, 2006).

Zhengrong Yao et al., "Tracking a detected face with dynamic programming", *Image and Vision Computing*, vol. 24, No. 6, pp. 573-580 (Jun. 1, 2006).

Bo Wu et al., "Fast Rotation Invariant Multi-View Face Detection Based on Real Adaboost", *Auto, Face & Gesture Recog.*, pp. 79-84 (May 17, 2004).

Chang Huang et al., "Vector Boosting for Rotation Invariant Multi-View Face Detection", *Comp. Vision 2005 Conf.*, Beijing, China pp. 446-453 (Oct. 17, 2005).

Chang Huang et al., "Omni-directional Face Detection Based on Real Adaboost", *Int'l Conf. on Image Proc.*, Singapore, pp. 593-596 (Oct. 24, 2004).

Chang Huang et al., "Boosting Nested Cascade Detector for Multi-View Face Detection", *Patt. Recog. Vision 2004 Conf.*, Cambridge, U.K., pp. 415-418 (Aug. 23, 2004).

Xiaoguang Lu et al., "Ethnicity Identification from Face Images", *Biomet. Tech. for Human Ident.*, Orlando, FL, pp. 114-123 (Apr. 12, 2004).

Office Action dated Oct. 4, 2011 issued in corresponding Japanese Application No. 2008-072442.

P. Viola et al., "Robust Real-Time Face Detection", International Journal of Computer Vision, vol. 57, pp. 137-154, May 2004.

H. Schneiderman et al., "A Statistical Method for 3D Object Detection Applied to Faces and Cars".

H. Rowley et al., "Neural Network-Based Face Detection", IEEE Transactions on Pattern Analysis and Machine Intelligence, vol. 20, No. 1, Jan. 1998.

\* cited by examiner

IMAGE PROCESSING METHOD AND DEVICE FOR OBJECT RECOGNITION

BACKGROUND OF THE INVENTION

1. Field of the Invention

The present invention relates to image processing, and particularly, to an object image detection device and method able to rapidly detect an object image from an input image.

2. Description of the Related Art

In recent years, usage of an object image detection technique has been widely spread. Here, the "object image detection technique" represents a technique of detecting objects such as faces or cars, from an image such as a picture, a still image, or a video image.

For example, this technique is described in U.S. Pat. No. 7,099,510 (hereinafter, referred to as "reference 1"), U.S. Pat. No. 7,020,337 (hereinafter, referred to as "reference 2"), and "Robust Real-Time Face Detection", P. Viola, M. J. Jones, International Journal of Computer Vision, vol. 57, pp. 137-154, May 2004 (hereinafter, referred to as "reference 3").

When applying the object image detection technique in the related art to a digital camera or other portable digital devices, the following problems occur. Namely, these portable digital devices have processors of low clock frequencies and memories of small capacities, thus lack high computation capability; as a result, the object image detection technique in the related art, which requires high computational capability, cannot be applied to these devices directly.

In addition, reference 1 and reference 2 disclose techniques of extracting image blocks from a specified image area of an input image, determining whether the specified image area is the desired object image, and, after obtaining all the object images, outputting these object images. However, reference 1 and reference 2 do not disclose a technique for rapid image detection. Usually, for example, when using digital cameras having functions of object image detection, users wish to observe detected images on a monitor as soon as possible. Therefore, the users require a technique able to rapidly detect object images and display the detected images to users even when the devices in use do not have high computational capability.

SUMMARY OF THE INVENTION

The present invention may solve one or more problems of the related art.

A preferred embodiment of the present invention may provide an object image detection device and an object image detection method able to rapidly detect an object image from an input image.

According to a first aspect of the present invention, there is provided an object image detection device for detecting one or more object images from an input image, comprising:

an image block generation unit configured to generate a plurality of image blocks from the input image for detecting the object images;

an image classification unit configured to determine whether each of the image blocks includes one or more of the object images by using one or more features of the object images, and acquire the image blocks including the object images to be object image candidates; and a detection unit configured to sequentially detect the object images from the object image candidates, wherein the image classification unit acquires the object image candidates based on a relative positional relationship between the image blocks and already-acquired object image candidates.

Preferably, the image classification unit discards one or more of the image blocks each at least partially overlapping the already-acquired object image candidates, and acquires the object image candidates from the image blocks remaining.

Preferably, the object image detection device further comprises:

a hierarchical image structure generation unit configured to arrange the input image in a hierarchical manner to generate a hierarchical image structure of the input image, wherein the image block generation unit generates the plural image blocks from the input image on each layer of the hierarchical image structure, and the image classification unit acquires the object image candidates on each of the layers of the hierarchical image structure.

Preferably, the image classification unit discards one or more of the image blocks in a current layer at least partially overlapping already-acquired object image candidates in other layers from the current layer, and acquires the object image candidates of the current layer from the remaining image blocks.

Preferably, the image classification unit makes the determination by using the features of the object images through a plurality of steps, the image classification unit determines whether the image blocks include the object images by using the features of the object images, stops the determination when it is determined that the image blocks do not include the object images, proceeds to a next step when it is determined that the image blocks include the object images, and the image classification unit determines whether the image blocks include the object images by using other features of the object images in the next step.

Preferably, the object image detection device further comprises:

an output unit configured to sequentially output the detected object images each time one of the object images is detected.

According to the embodiments of the present invention, since image blocks overlapping already detected object images are discarded, the amount of computation for object image detection is greatly reduced, and the speed of object image detection is greatly increased, thus, it is possible to rapidly detect object images.

These and other objects, features, and advantages of the present invention will become more apparent from the following detailed description of preferred embodiments given with reference to the accompanying drawings.

DESCRIPTION OF THE PREFERRED EMBODIMENTS

Below, preferred embodiments of the present invention are explained with reference to the accompanying drawings.

Figure 1:
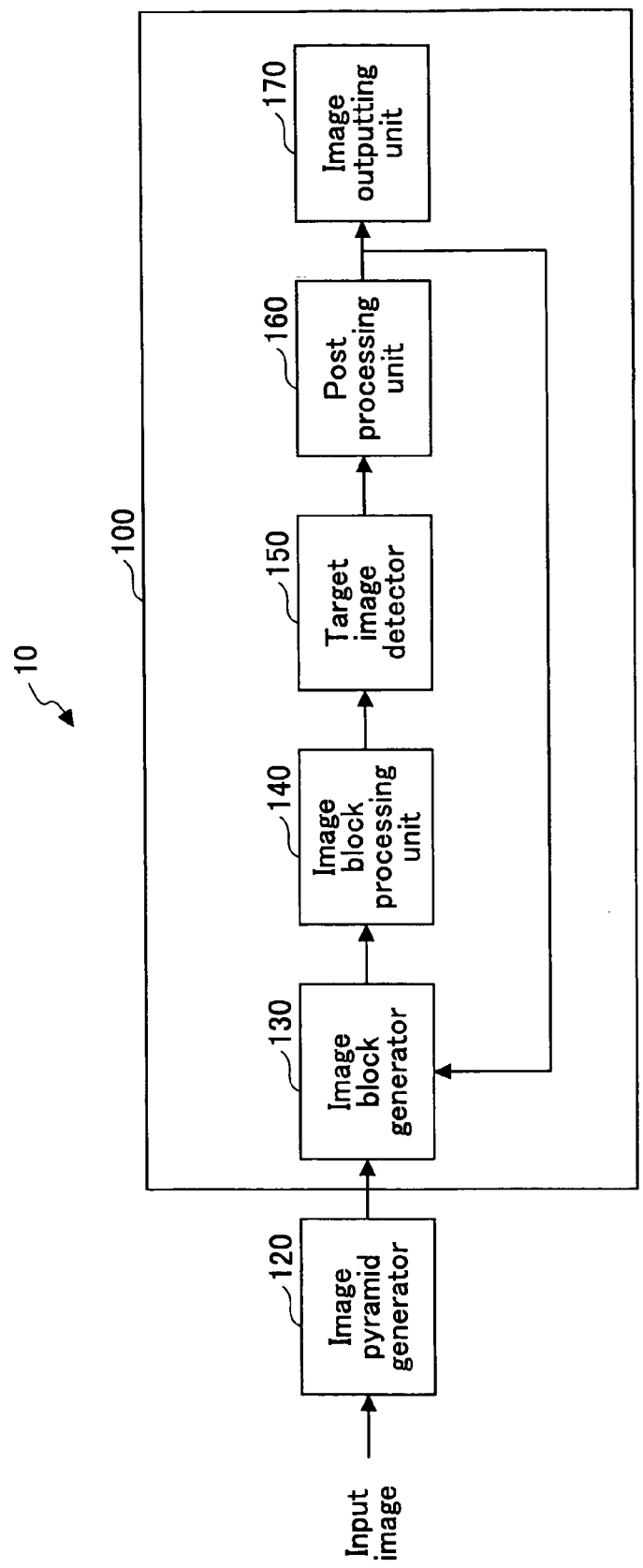
FIG. 1 is a block diagram illustrating an object image detection device according to an embodiment of the present invention.

FIG. 1 is a block diagram illustrating an object image detection device according to an embodiment of the present invention.

For example, the object image detection device according to the present embodiment is installed in a digital camera or other portable digital devices, and when taking pictures of figures or a view, the object image detection device detects faces of the figures, or characteristic portions of the view, and uses the detection results for focusing or other adjustment. In the following, for purposes of simplicity, face detection is primarily used as an example. However, it should be noted that the object image detection device of the present embodiment is not limited to the above application.

As shown in FIG. 1, the object image detection device 10 of the present embodiment includes an image pyramid generator 120, an image block generator 130, an image block processing unit 140, an object image detector 150, a post processing unit 160, and an image outputting unit 170.

For example, an image sensor of a camera captures an image 101 of a subject of shooting, and outputs signals of the image 101 to the object image detection device 10. Below, this image is referred to as "input image 101", and this signal is referred to as "input image signal".

Figure 2:
FIG. 2 is a diagram illustrating the input image 101.

FIG. 2 is a diagram illustrating the input image 101.

As shown in FIG. 2, there are face images 102, 103, and so on in the input image 101.

The image pyramid generator 120 generates an image pyramid structure 20 of the input image 101. Here, the "image pyramid structure" corresponds to the "hierarchical image structure" of the current application.

Figure 3:
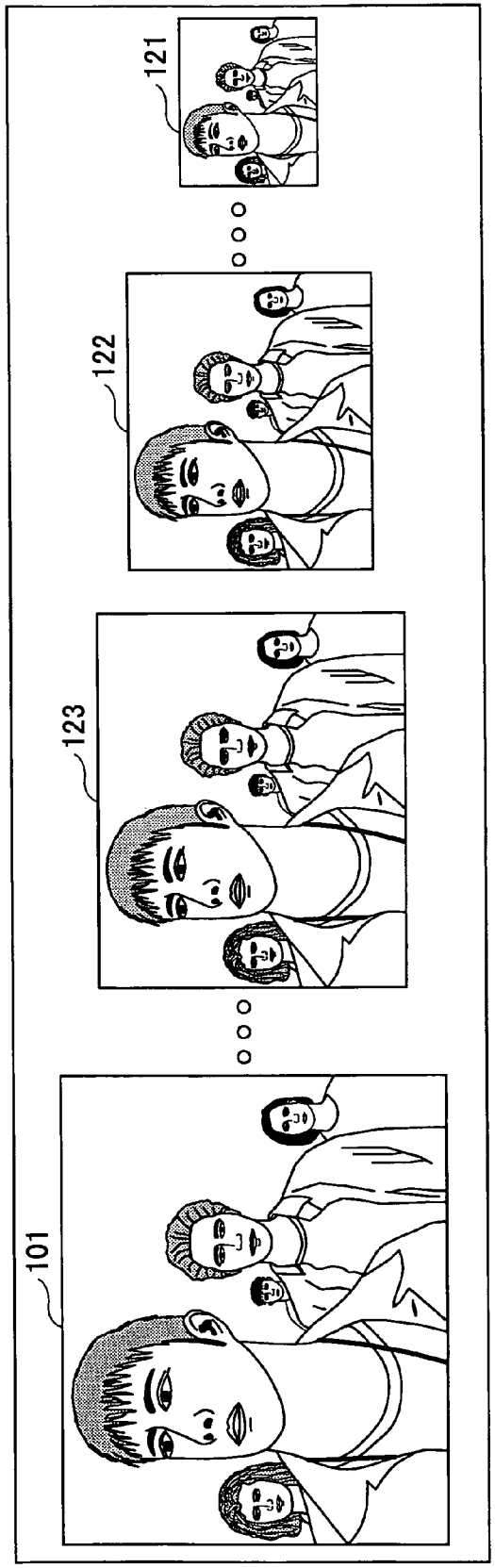
FIG. 3 is a diagram illustrating the image pyramid structure 20 generated by the image pyramid generator 120.

FIG. 3 is a diagram illustrating the image pyramid structure 20 generated by the image pyramid generator 120.

As shown in FIG. 3, the image pyramid generator 120 reduces the size of the input image 101 to obtain a series of images 121, 122, 123 having different sizes, and the series of images 121, 122, 123 having different sizes constitute different layers of the image pyramid structure 20. That is, different layers of the image pyramid structure 20 have the same image but different sizes.

It should be noted that the image pyramid generator 120 can generate the image pyramid structure by enlarging the input image 101 to obtain a series of images having different enlarged sizes.

For example, the image pyramid generator 120 generates the image pyramid structure by a Voila Integral image method, a Gaussian pyramid method, or Laplacian pyramid method. Further, the image pyramid generator 120 may generate the image pyramid structure by down-sampling the input image signal with a given down-sampling parameter. Certainly, the image pyramid generator 120 can generate the image pyramid structure by other methods.

In FIG. 3, it is illustrated that the image pyramid structure 20 has n layers from a first layer including the smallest image 121, a (j−1)-th layer including the image 122, a j-th layer including the image 123, and an n-th layer including the largest image 101.

Because of the image pyramid structure, it is possible to rapidly detect the object images. In addition, as described below, because the image pyramid structure 20 has plural layers, and images in different layers have different sizes, the image block generator 130 can use a rectangular window having a given size to detect face images of different sizes in the input image 101.

The image block generator 130, in order to detect object images such as face images in the input image 101, divides each of the images in different layers of the image pyramid structure 20 into plural image blocks to generate image block groups of each of the images in different layers. In the subsequent procedure, it is detected whether the object images exist in each of the image blocks.

The image blocks can be generated in various ways. For example, a rectangular window having a given size is applied on each of the images in different layers, and the image area covered by the window is defined as an image block. Then, the window is moved successively at a given step size to scan the input image 101, the image areas covered by the window at different positions are extracted as image blocks. In doing so, image blocks at different positions of the input image 101 are generated, and this enables detection of face images at different positions.

In addition, since the images in the different layers of the image pyramid structure 20 have different sizes, the image block generator 130 can use the same rectangular window having a given size to detect face images of different sizes in the input image 101.

For example, the input image 101 has 320×240 pixels, the image block has 20×20 pixels, and the step size in the horizontal and vertical directions is 3 pixels.

The image block processing unit 140 determines image blocks of a current layer which overlap already-detected object images in other layers, and discards the overlapping image blocks. Specifically, among image blocks in the current layer, the image block processing unit 140 determines whether image blocks exist which overlap the object images (for example, face images) already detected in previous image detection steps. When such overlapping image blocks are found, the image block processing unit 140 discards the overlapping image blocks from the image block group of the current layer, and the remaining image blocks are regarded as valid image blocks of the current layer.

Figure 4:
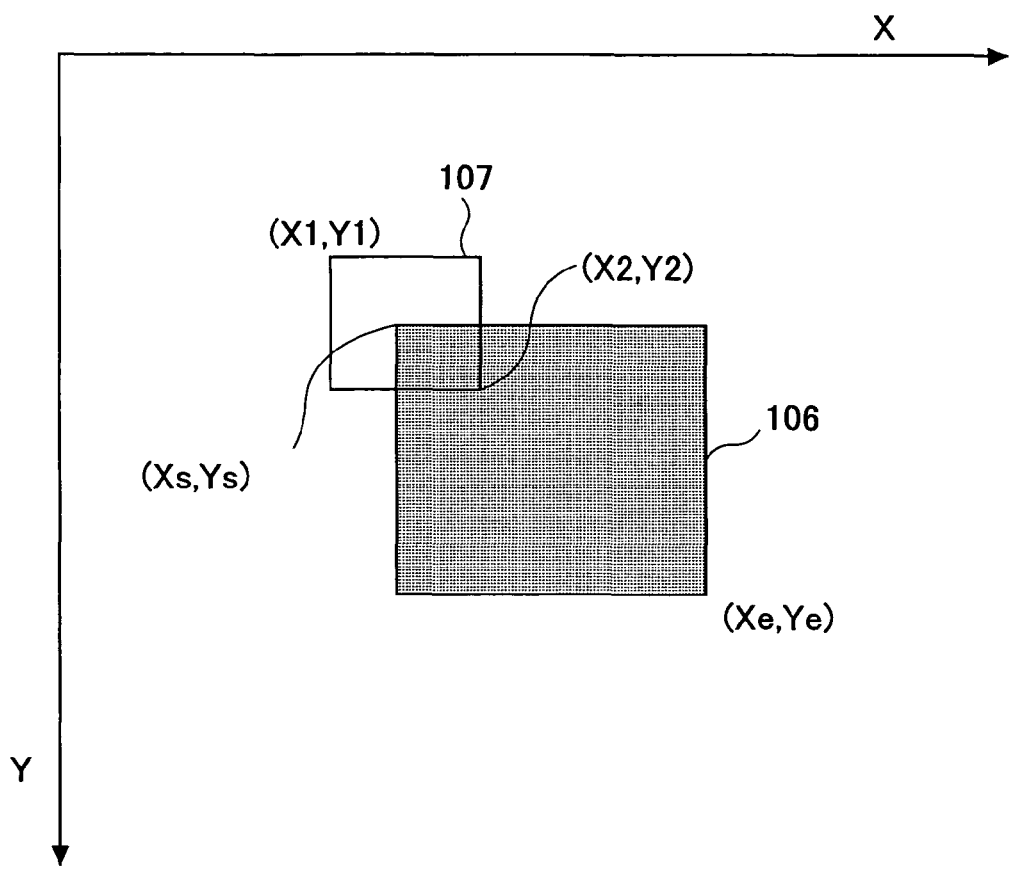
FIG. 4 is a diagram illustrating conditions for determining overlapping between image blocks and object images.

FIG. 4 is a diagram illustrating conditions for determining overlapping of image blocks and object images.

As shown in FIG. 4, assume coordinates of the left-upper corner of an image block 107 are (X1, Y1), coordinates of the right-lower corner of the image block 107 are (X2, Y2), coordinates of the left-upper corner of an object image 106 are (Xs, Ys), and coordinates of the right-lower corner of the object image 106 are (Xe, Ye).

For example, the following formulas are used to determine whether the image block 107 overlaps the object image 106.

$$Xs<X2<Xe, \text{ and } Ys<Y2<Ye$$

or $$Xs<X1<Xe, \text{ and } Ys<Y1<Ye$$

When coordinates of the image block 107 and the object image 106 satisfy the above formula, it is determined that the image block 107 overlaps the object image 106.

Of course, the conditions for determining overlapping of the image block 107 and the object image 106 can be decided according to precision and speed of object image detection.

For example, one or more of the following conditions can be used to determine overlapping of the image block 107 and the object image 106.

(1) the image block 107 is completely within the object image 106.

(2) the image block 107 partially overlaps the object image 106, but the area percentage of the overlapping portion is greater than a preset value.

(3) the image block 107 and the object image 106 have at least one overlapping pixel.

Since image blocks overlapping the already-detected object images (for example, face images) in other layers are discarded, and only the remaining valid image blocks are used for object image detection, unnecessary computation is omitted; thus the amount of computation is reduced, and this enables rapid object image detection.

The object image detector 150 determines whether object images (for example, face images) exist in the input valid image blocks.

Figure 5:
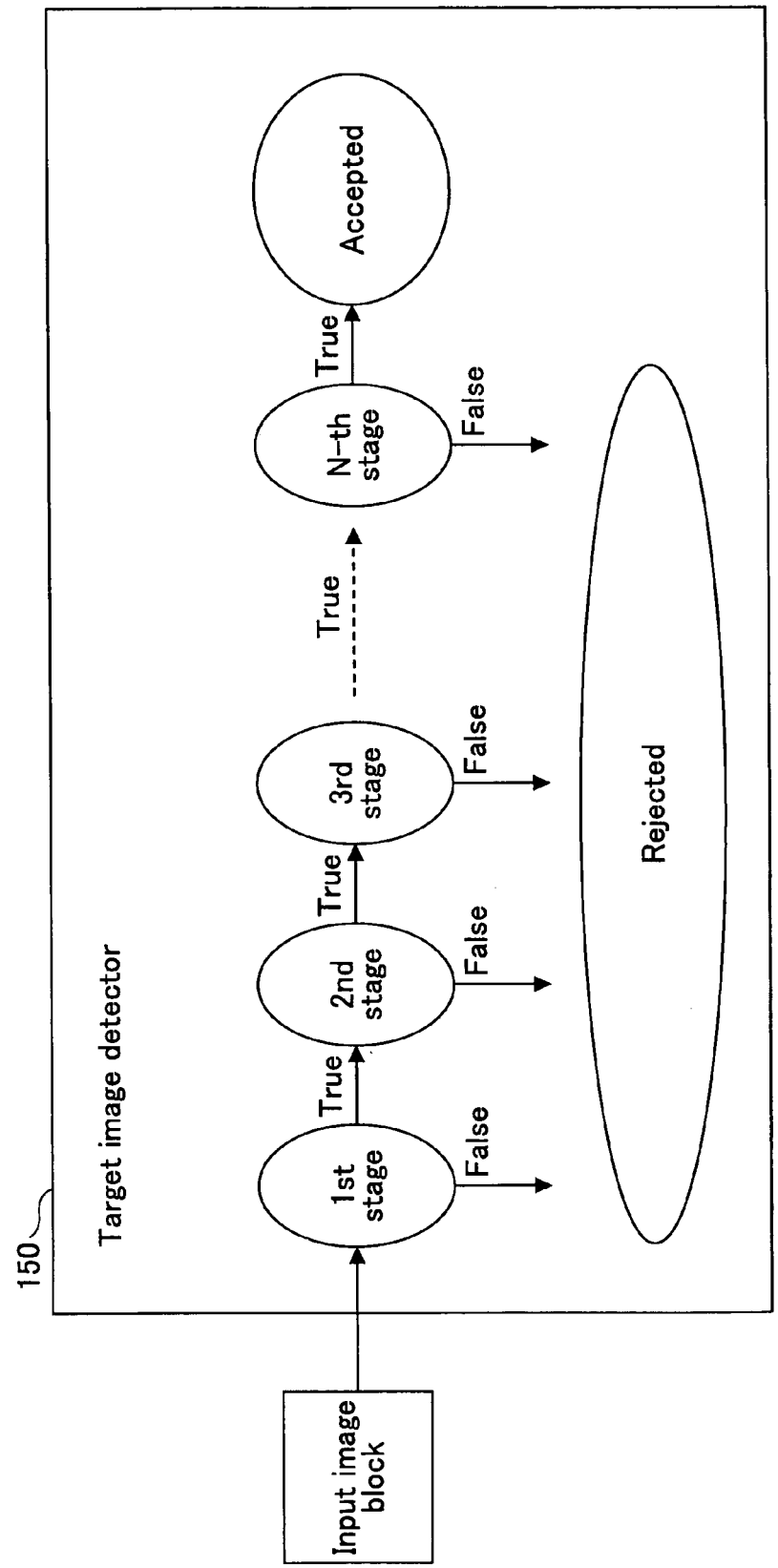
FIG. 5 is a block diagram illustrating a configuration of the object image detector 150 according to the present embodiment.

FIG. 5 is a block diagram illustrating a configuration of the object image detector 150 according to the present embodiment.

As shown in FIG. 5, in the present embodiment, the object image detector 150 is composed of a cascade boosting image classifier, and the method disclosed in reference 3 is used to detect the object images, that is, Harr wavelets are used as features in face detection, and the value of the Harr wavelet feature is used for image classification.

Figure 6:
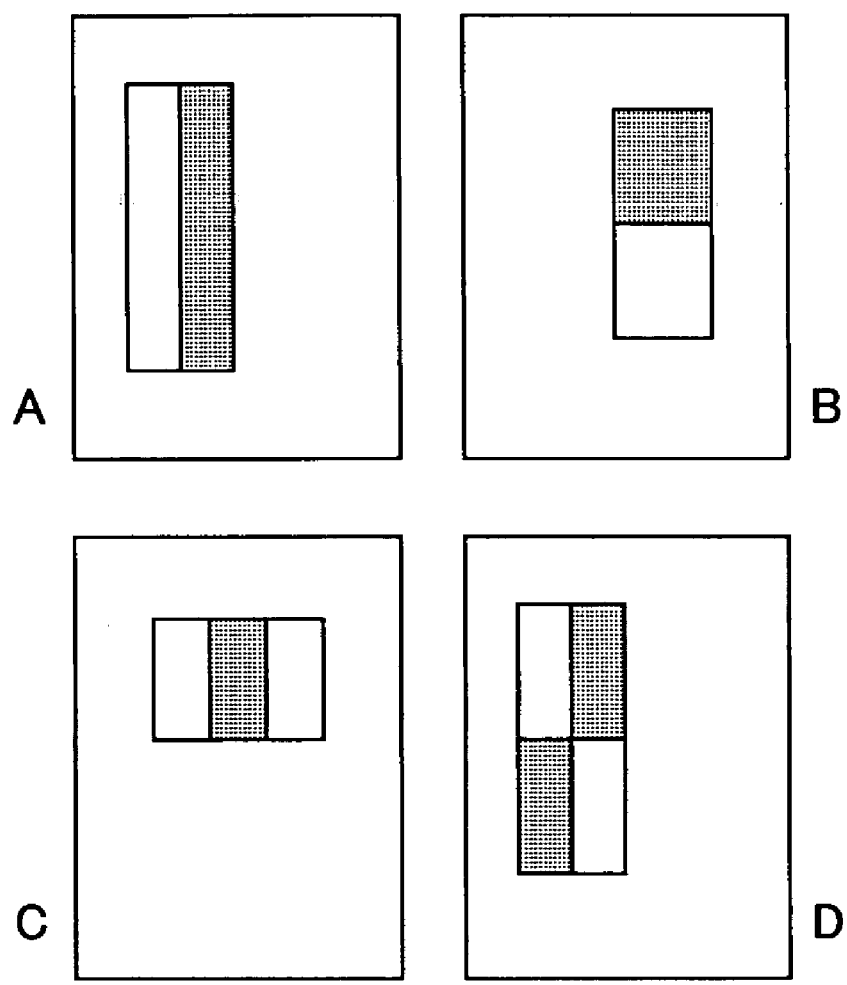
FIG. 6 is a diagram illustrating Harr wavelet features for face detection.

FIG. 6 is a diagram illustrating Harr wavelet features for face detection.

In FIG. 6, A, B, C, and D are a two-rectangle feature, a two-rectangle feature, a three-rectangle feature, and a four-rectangle feature, respectively, and the large rectangles are the windows for object image detection, that is, the large rectangles represent image blocks.

In the two-rectangle feature A, the two rectangles have the same size and shape and are horizontally adjacent, and in the two-rectangle feature B, the two rectangles are vertically adjacent. The value of a two-rectangle feature is the difference between the sum of the pixels within two rectangular regions. Specifically, the sum of the pixels which lie within the white rectangle are subtracted from the sum of the pixels which lie within the grey rectangle.

The three-rectangle feature computes the sum within two outside rectangles subtracted from the sum in a center rectangle, and the four-rectangle feature computes the difference between diagonal pairs of rectangles.

Returning to FIG. 5, each of the valid image blocks of the current layer is input to the object image detector 150. The object image detector 150 includes N-stage boosted image classifiers, and the N-stage classifiers are applied to every input image block sequentially. The boosted image classifiers can be constructed to reject many of the negative rectangle features (refer to FIG. 6) while detecting almost all positive instances. For example, the first stage in the cascade may be a two-feature classifier, and a threshold is assigned to the classifier to yield a specified error rate (False), which indicates that highly probably a face image is not included in the input image block, and positive rate (True), which indicates that highly probably a face image is included in the input image block. A positive result (True) from the first-stage classifier (that is, the value of features is greater than the assigned threshold) triggers the evaluation of a second-stage classifier which has also been adjusted to achieve very high detection rates. The image blocks which are not rejected by the first-stage classifier are processed by the second-stage classifier, which is more complex than the first-stage classifier. A positive result (True) from the second-stage classifier triggers the evaluation of a third-stage classifier, and so on. When all of the N-stage classifiers give positive results (True), the object image detector 150 determines that a face image is included in the input image block, and the input image block is regarded as a face image candidate.

On the other hand, a negative outcome (False) at any point leads to immediate rejection of the image block, and no further processing is performed.

The post processing unit 160 processes all face image candidates, namely, the selected image blocks, in an image on the current layer to determine face image data and number of the face images of the current layer. Alternatively, the post processing unit 160 may determine the face image data and the number of the face images from the first layer to the current layer.

The image outputting unit 170, for example, outputs the detected face images to a monitor of a digital camera for view by a user.

Next, explanations are made of operations of the object image detection device 10.

Figure 7:
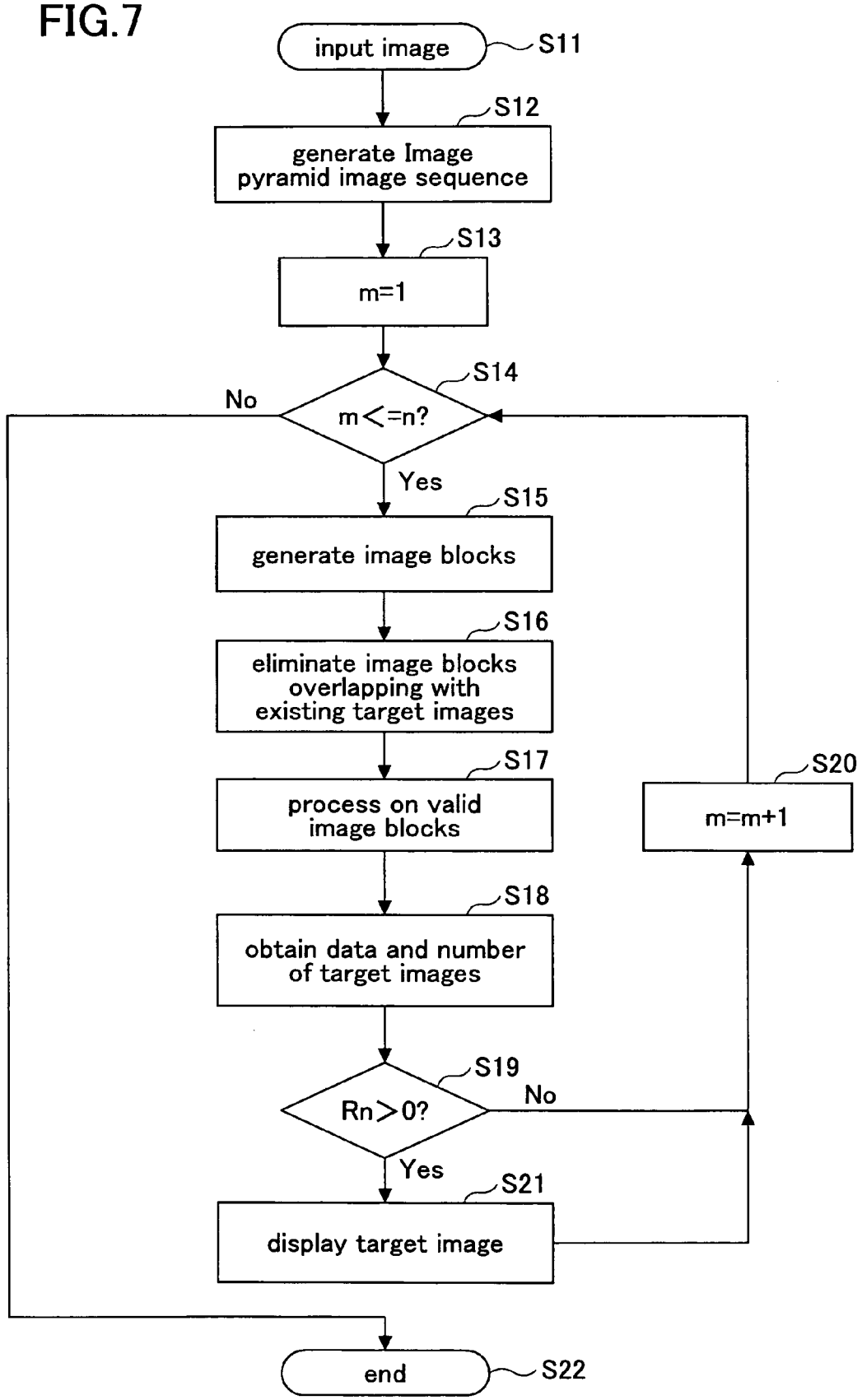
FIG. 7 is a flowchart illustrating operations of the object image detection device 10.

FIG. 7 is a flowchart illustrating operations of the object image detection device 10.

In step S11, an image sensor of a camera captures an image 101 of a subject of shooting (refer to FIG. 2), and outputs signals of the image 101 to the object image detection device 10.

In step S12, the image pyramid generator 120 generates the image pyramid structure 20 (refer to FIG. 3) of the input image 101, specifically, the image pyramid generator 120 reduces the size of the input image 101 to obtain a series of images 121, 122, 123 having different sizes, and this series of images 121, 122, 123 constitute different layers of the image pyramid structure 20. That is, different layers of the image pyramid structure 20 have the same image but of different sizes. For example, the image pyramid structure 20 has n layers including a first layer having the smallest image 121, a (j−1)-th layer having the image 122, a j-th layer having the image 123, and an n-th layer having the largest image 101.

The image pyramid generator 120 inputs the thus obtained image pyramid structure 20 to the image block generator 130.

In step S13, the image block generator 130 performs processing on the image 121 of the first layer (m=1). When processing on images of all the layers is completed, the procedure of object image detection is finished (step S22).

Otherwise, in step S15 the image block generator 130 divides the image 121 of the first layer of the image pyramid structure 20 into plural image blocks to generate an image block group of the first layer.

For example, the image pyramid structure 20 uses a rectangular window of 20×20 pixels, and the window is moved to scan the image 121 from the left-upper corner of the image 121 successively in the horizontal direction and in the vertical direction at a step size of 3 pixels, and thus successively obtains image blocks each having 20×20 pixels. After scanning the image 121 is completed, an image block group I1 includes the image blocks each having 20×20 pixels. The image block group I1 is input to the image block processing unit 140.

In step S16, the image block processing unit 140 determines, valid image blocks from the input image block group I1.

Since the image 121 is the first layer (m=1), and there is no overlapping image block, all image blocks in the input image block group I1 are determined to be valid image blocks, and these valid image blocks constitute a valid image block group I1v of the image 121.

The valid image block group I1v is input to the object image detector 150.

In step S17, the object image detector 150 determines whether object images (for example, face images) exist in the valid image block group I1v of the first layer, and obtains one or more face image candidates, of which each represents an image block probably including a face image.

Figure 8:
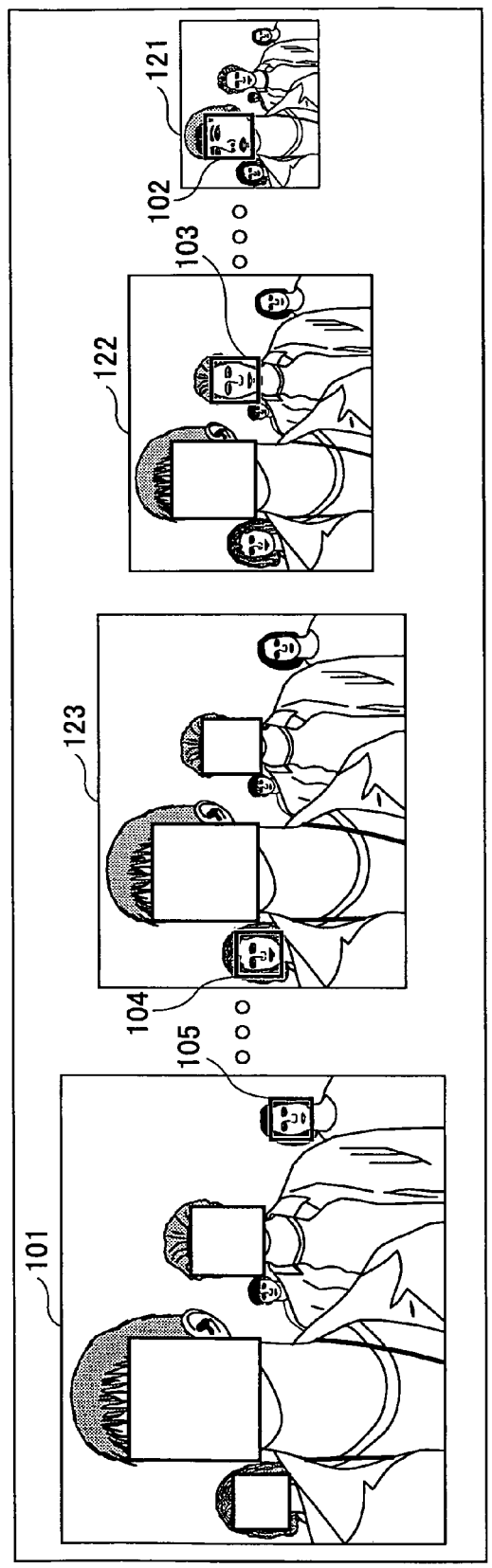
FIG. 8 is a diagram illustrating object image detection in the present embodiment.

FIG. 8 is a diagram illustrating object image detection in the present embodiment.

As shown in FIG. 8, in the image 121, a face image 102 is detected as a face image candidate.

The thus obtained one or more face image candidates constitute a face image candidate group S1 of the image 121, and the face image candidate group S1 is input to the post processing unit 160.

In step S18, the post processing unit 160 determines face image data and the number of the face images from the face image candidate group S1. Specifically, the post processing unit 160 determines that one face image 102 is detected in the image 121, and thus, the number (R1) of the face images in the image 121 is one (R1=1).

If no face image is detected, namely, when the number R1 of the face images in the image 121 is zero (No in step S19), the procedure returns to step S14, and then proceeds to the next layer (step S20).

In step S21, the image outputting unit 170, for example, outputs the detected face image 102 in the image 121 to a monitor of a digital camera for view by a user.

Figure 9:
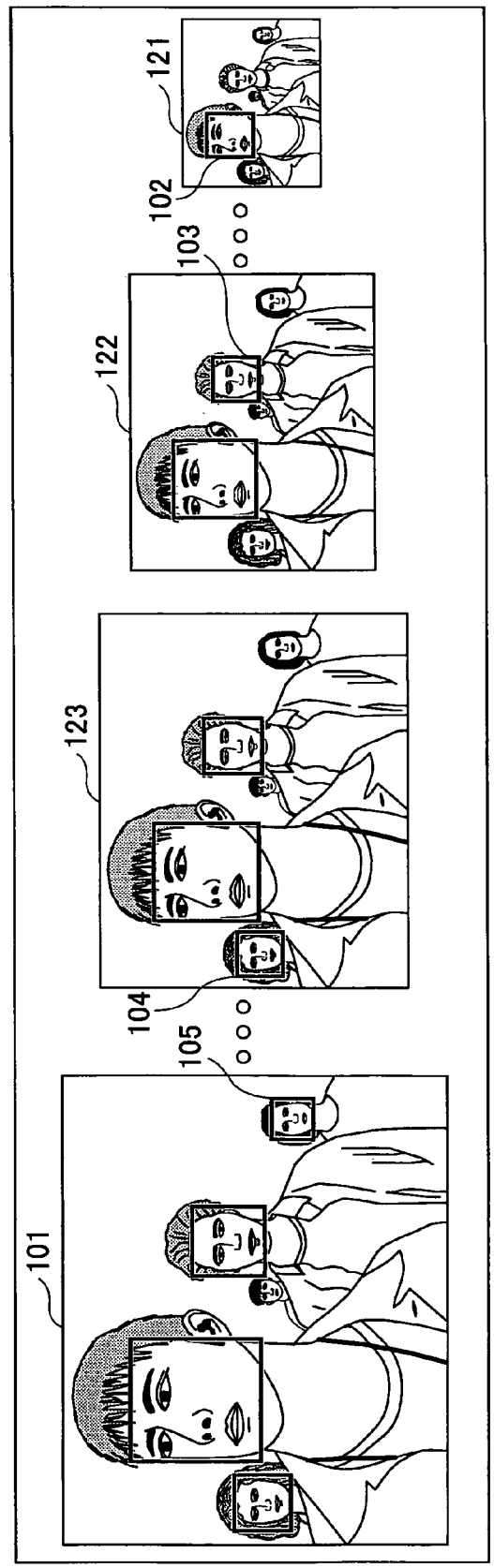
FIG. 9 is a diagram illustrating a procedure for displaying the detected object image in the present embodiment.

FIG. 9 is a diagram illustrating a procedure of displaying the detected object image in the present embodiment.

As shown in FIG. 9, the face image 102 detected in the image 121 is displayed to be enclosed by an open square.

It should be noted that in FIG. 9, for convenience of illustration and comparison to FIG. 8, the procedure of displaying the detected object images is illustrated in the pyramid manner. In practical application, the detected object images are displayed on the same monitor sequentially.

Then, the procedure of object image detection returns to step S14 to repeat step S14 through step S21 for processing of the next layer (m=m+1) of the image pyramid structure 20 (step S20).

Next, explanations are made of operations of detecting a face image from the image 122 of the (j−1)-th layer.

In step S15, the image block generator 130 scans the image 122 to generate an image block group Ij−1 including image blocks each having 20×20 pixels.

In step S16, the image block processing unit 140 determines valid image blocks from the input image block group Ij−1 of the image 122.

As shown in FIG. 8, in the image block group Ij−1 of the image 122, there exists an image block overlapping the face image 102 detected in the image 121 of the first layer (m=1), the image block processing unit 140 discards the overlapping image block in the image block group Ij−1, and regards the remaining image blocks as valid image blocks of the (j−1)-th layer. These valid image blocks constitute a valid image block group Ij−1v of the image 122.

As shown in FIG. 8, the image block overlapping the face image 102 in the image 121 is removed from the image 122, and is illustrated to be covered with a white square.

In step S17, the object image detector 150 determines whether object images (for example, face images) exist in the input valid image blocks of the valid image block group Ij−1v of the (j−1)-th layer, and thus obtains one or more face image candidates.

As shown in FIG. 8, in the image 122, a face image 103 is detected as a face image candidate.

The thus obtained one or more face image candidates constitute a face image candidate group Sj−1 of the image 122, and the face image candidate group Sj−1 is input to the post processing unit 160.

In step S18, the post processing unit 160 determines face image data and the number of the face images from the face image candidate group Sj−1. Specifically, the post processing unit 160 determines that one face image 103 is detected in the image 122, and thus, the number Rj−1 of the face images in the image 122 is one (Rj−1=1).

As shown in FIG. 8, the face image 103 is detected in the image 122.

In step S21, the image outputting unit 170, for example, outputs the detected face image 103 in the image 122 to the monitor of a digital camera for viewing by a user.

As shown in FIG. 9, in addition to the face image 102, the face image 103 detected in the image 122 is also displayed to be enclosed by an open square.

After the procedure of detecting a face image from the image 122 of the (j−1)-th layer is finished, the procedure of object image detection proceeds to processing of images on the next layer (m=j) of the image pyramid structure 20, namely, processing of the image 123 on the j-th layer.

In step S15, the image block generator 130 scans the image 123 to generate an image block group Ij including image blocks each having 20×20 pixels.

In step S16, the image block processing unit 140 determines valid image blocks from the input image block group Ij of the image 123.

Specifically, the image block processing unit 140 determines, in the image block group Ij, whether there exist image blocks overlapping the face images detected in the first layer (m=1) through the (j−1)-th layer (m=j−1), and discards the overlapping image blocks in the image block group Ij. The remaining image blocks in the image block group Ij are regarded as valid image blocks of the j-th layer. These valid image blocks constitute a valid image block group Ijv of the image 123.

As shown in FIG. 8, in the image 123, there are image blocks overlapping the face image 102 in the image 121 of the first layer (m=1), and the face image 103 in the image 122 of the (j−1)-th layer (m=j−1). These overlapping image blocks are removed from the image 123, and are illustrated to be covered with white squares.

In step S17, the object image detector 150 determines whether object images (for example, face images) exist in the input valid image blocks of the valid image block group Ijv of the j-th layer, and thus obtains one or more face image candidates.

As shown in FIG. 8, in the image 123, the face image 104 is detected as a face image candidate.

The thus obtained one or more face image candidates constitute a face image candidate group Sj of the image 123, and the face image candidate group Sj is input to the post processing unit 160.

In step S18, the post processing unit 160 determines face image data and the number of the face images from the face image candidate group Sj. Specifically, the post processing unit 160 determines that one face image 104 is detected in the image 123, and thus, the number Rj of the face images in the image 123 is one (Rj=1).

In step S21, the image outputting unit 170, for example, outputs the detected face image 104 in the image 123 to the monitor of a digital camera for view by a user.

As shown in FIG. 9, in addition to the face images 102, 103, the face image 104 detected in the image 123 is also displayed to be enclosed by an open square.

The procedure of detecting a face image is performed in the same way until the image 101 of the last layer (m=n).

For the image 101 of the n-th layer, in step S15, the image block generator 130 scans the image 101 to generate an image block group In including image blocks each of 20×20 pixels.

In step S16, the image block processing unit 140 determines valid image blocks from the input image block group In of the image 101. That is, the image block processing unit 140 determines, in the image block group In, whether there exist image blocks overlapping the face images detected in all the previous layers, and discards the overlapping image blocks in the image block group In. The remaining image blocks in the image block group In are regarded as valid image blocks of the n-th layer. These valid image blocks constitute a valid image block group Inv of the image 101.

As shown in FIG. 8, in the image 123, there are image blocks overlapping the face image 102 detected in the image 121 of the first layer (m=1), the face image 103 detected in the image 122 of the (j−1)-th layer (m=j−1), and the face image 104 detected in the image 123 of the j-th layer (m=j). These overlapping image blocks are removed from the image 123, and are illustrated to be covered with white squares.

In step S17, the object image detector 150 determines whether object images (for example, face images) exist in the input valid image blocks of the valid image block group Inv of the n-th layer, and thus obtains one or more face image candidates.

As shown in FIG. 8, in the image 101, a face image 105 is detected as a face image candidate.

The thus obtained one or more face image candidates constitute a face image candidate group Sn of the image 101, and the face image candidate group Sn is input to the post processing unit 160.

In step S18, the post processing unit 160 determines face image data and the number of the face images from the face image candidate group Sn. Specifically, the post processing unit 160 determines that one face image 105 is detected in the image 101, and thus, the number Rn of the face images in the image 101 is one (Rn=1).

In step S21, the image outputting unit 170, for example, outputs the detected face image 105 in the image 101 to the monitor of a digital camera for view by a user.

As shown in FIG. 9, in addition to the face images 102, 103, 104, the face image 105 detected in the image 101 is also displayed to be enclosed by an open square.

For purposes of personal authentication, image formation, target tracking, or other applications, the detected face images 102, 103, 104, and 105 may be stored in a storage device.

In step S22, when processing on the last layer is completed, the procedure of face image detection is finished.

According to the present invention, when detecting object images in different layers, image blocks overlapping object images already detected in other layers are discarded. As a result, the amount of computation for object image detection is greatly reduced, and the speed of object image detection is greatly increased; thus it is possible to rapidly detect object images.

In addition, instead of displaying all object images after these object images are all detected as in the related art, in the present invention, each detected object image is displayed on the monitor once it is detected; therefore, users can observe the detected images on the monitor as soon as possible.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

For example, in the above embodiments, description is made primarily with face detection as an example. However, the present invention is not limited to this, but can be applied to detection of other object images, like cars or roads.

In the above embodiments, it is described that an image pyramid structure of the input image is generated. However, the present invention is not limited to this, but generation of an image pyramid structure of the input image can be omitted.

In the above embodiments, it is described that the object image detector 150 includes a cascade boosting image classifier. However, the present invention is not limited to this. Any method enabling detection of object images based on features of the object images is applicable. For example, when detecting face images, face detection based on template matching or on skin color may be used.

This patent application is based on Chinese Priority Patent Application No. 200710087879 filed on Mar. 21, 2007, the entire contents of which are hereby incorporated by reference.

What is claimed is:

1. An object image detection device for detecting one or more object images from an input image, comprising:
    an image block generation unit configured to generate a plurality of image blocks from the input image for detecting the object images;
    an image classification unit configured to determine whether each of the image blocks includes one or more of the object images by using one or more features of the object images, and acquire the image blocks including the object images to be object image candidates;
    a detection unit configured to sequentially detect the object images from the object image candidates;
    a hierarchical image structure generation unit configured to arrange the input image in a hierarchical manner to generate a hierarchical image structure of the input image; wherein
    the image block generation unit generates the plural image blocks from the input image on each layer of the hierarchical image structure,
    the image classification unit acquires the object image candidates on each of the layers of the hierarchical image structure; and wherein
    the image classification unit discards one or more of the image blocks in a current layer at least partially overlapping any of the already-acquired object image candidates in other layers from the current layer, and acquires the object image candidates of the current layer only from the remaining image blocks.

2. The object image detection device as claimed in claim 1, further comprising an output unit configured to sequentially output each detected object image as soon as said each detected object image has been detected, and outputting the detected object images sequentially as they are detected in successive layers.

3. The object image detection device as claimed in claim 1, wherein the image classification unit:

makes the determination by using the features of the object images through a plurality of steps;

determines whether the image blocks include the object images by using the features of the object images;

stops the determination upon determining that the image blocks do not include the object images;

proceeds to a next step upon determining that the image blocks include the object images; and determines whether the image blocks include the object images by using other features of the object images in the next step.

4. The object image detection device as claimed in claim 2, wherein the image classification unit:

makes the determination by using the features of the object images through a plurality of steps;

determines whether the image blocks include the object images by using the features of the object images;

stops the determination upon determining that the image blocks do not include the object images;

proceeds to a next step upon determining that the image blocks include the object images; and determines whether the image blocks include the object images by using other features of the object images in the next step.

5. An object image detection method for detecting one or more object images from an input image, comprising:

generating a plurality of image blocks from the input image to detect the object images, wherein the plural image blocks are generated from the input image on each layer of the hierarchical image structure, and;

determining whether each of the image blocks includes one or more of the object images by using one or more features of the object images, and acquiring the image blocks including the object images to be object image candidates, wherein, the object image candidates are acquired on each of the layers of the hierarchical image structure, and wherein one or more of the image blocks in a current layer at least partially overlapping any of the already-acquired object image candidates in other layers are discarded from the current layer, and the object image candidates of the current layer are acquired only from the remaining image blocks;

sequentially detecting the object images from the object image candidates; and arranging the input image in a hierarchical manner to generate a hierarchical image structure of the input image.

6. The object image detection method as claimed in claim 5, further comprising:

sequentially outputting the detected object images each time one of the object images is detected.

7. The object image detection method as claimed in claim 5, wherein:

the determining whether each of the image blocks includes one or more of the object images is performed by using the features of the object images through a plurality of steps, and upon determining whether the image blocks include the object images by using the features of the object images, the determination is stopped upon determining that the image blocks do not include the object images, a next determination is made upon determining that the image blocks include the object images, and upon determining whether the image blocks include the object images by using other features of the object images in the next step.

8. The object image detection method as claimed in claim 6, wherein the determining whether each of the image blocks includes one or more of the object images is performed by using the features of the object images through a plurality of steps, and upon determining whether the image blocks include the object images by using the features of the object images, the determination is stopped upon determining that the image blocks do not include the object images, a next determination is made upon determining that the image blocks include the object images, and upon determining whether the image blocks include the object images by using other features of the object images in the next step.

9. A non-transitory computer readable medium, which when read and executed by a computer, performs an object image detection method according to claim 5.

10. A non-transitory computer readable medium, which when read and executed by a computer, performs an object image detection method according to claim 6.

11. A non-transitory computer readable medium, which when read and executed by a computer, performs an object image detection method according to claim 7.

12. A non-transitory computer readable medium, which when read and executed by a computer, performs an object image detection method according to claim 8.

* * * * *